United States Patent
Lambertus

[11] Patent Number: 5,223,279
[45] Date of Patent: Jun. 29, 1993

[54] GRANULATING DEVICE FOR PLASTIC COMPOUNDS

[75] Inventor: Friedrich Lambertus, Stuttgart, Fed. Rep. of Germany

[73] Assignee: Werner & Pfleiderer GmbH, Stuttgart, Fed. Rep. of Germany

[21] Appl. No.: 871,302

[22] Filed: Apr. 20, 1992

[30] Foreign Application Priority Data

May 24, 1991 [DE] Fed. Rep. of Germany ....... 4116933

[51] Int. Cl.⁵ ...................... B28B 11/16; B29C 47/00
[52] U.S. Cl. .................................. 425/186; 264/142; 425/192 R; 425/311; 425/313
[58] Field of Search ................. 264/142, 143; 425/67, 425/142, 310, 311, 186, 192 R, 313

[56] References Cited

U.S. PATENT DOCUMENTS

| | | | |
|---|---|---|---|
| 3,271,821 | 9/1966 | Street | 425/311 |
| 3,355,767 | 12/1967 | Niemeyer | 425/313 |
| 3,732,049 | 5/1973 | Studli | 425/311 |
| 3,792,950 | 2/1974 | Cuff | 425/313 |
| 4,321,026 | 3/1982 | Lambertus | 425/142 |
| 4,500,271 | 2/1985 | Smith | 425/67 |
| 4,710,113 | 12/1987 | Voigt | 425/67 |
| 4,728,276 | 3/1988 | Pauley et al. | 425/67 |
| 5,110,523 | 5/1992 | Guggiari | 425/311 |

FOREIGN PATENT DOCUMENTS 3702841 1/1987 Fed. Rep. of Germany.

Primary Examiner—Scott Bushey
Attorney, Agent, or Firm—Ladas & Parry

[57] ABSTRACT

A granulating device for plastic compounds in which cutting knives of a cutting device face the die plate of a granulating head to form granules of plastic strings extruded from the die plate. The cutting knives are supported on a cutting shaft driven in rotation by a drive shaft of a drive motor. The cutting shaft is rotatably supported in fixed axial position in a housing. In order to obtain a planar parallel and central positioning of the cutting knives relative to the die plate, for example, due to thermal displacement, the housing and drive unit are guided together in a displaceable manner on guide shafts having first ends fixed to the granulating head and opposite ends which are vertically supported for universal pivotable movement in the manner of propped cantilever beams.

14 Claims, 2 Drawing Sheets

GRANULATING DEVICE FOR PLASTIC COMPOUNDS

FIELD OF THE INVENTION

The invention relates to a granulating device for plastic compounds and particularly to an adjustment means for adjusting the position of the cutting knives and the die plate of the granulating device.

The invention particularly relates to the construction of a support for the entire cutting unit and its drive which enables its displacement towards and away from the die plate.

BACKGROUND AND PRIOR ART

DE-A-37 02 841 discloses a granulating device in which the drive motor for the shaft of the cutting knives and its housing are attached to a bearing plate supported by adjustable helical springs, which in addition to an elastic mounting of the bearing plate, also permits a specific change in its position when the cutting unit is in a suspended position.

The construction has the disadvantage that a relatively large lateral or vertical displacement occurs in the region of the elastic support even for a small displacement of the granulating head caused, for example, by heat expansion, due to the overall length of the bearing plate. Consequently, a uniformly accurate guidance of the cutting knives relative to the die plate is not obtained.

In order to achieve a uniform cutting action at the surface of the die plate by the cutting knives in the granulating device, a precise perpendicular placement of the shaft of the cutting knives with respect to the front surface of the die plate is necessary. One difficulty imposed by this requirement is that the die plate is not fixed but undergoes displacement at the beginning and during the granulation operating due to temperature changes.

Furthermore, an accurately-reproducible central positioning of the cutting knives relative to the die plate is of considerable importance in that this same initial position of the cutting knives is again established after an interruption in operation. Only, as long as these requirements are fulfilled, can there be a continuous production of objection-free strands or strings of plastic material and granulates of uniform quality.

SUMMARY OF THE INVENTION

An object of the invention is to provide a granulating device of simple construction which will achieve the formation of granulates of uniform quality.

In accordance with the invention, the cutting unit, including the knives, housing and drive means is supported for common displacement on a pair of guide shafts fixedly secured to the granulating head and resting on supports at locations spaced from the granulating head.

DE-A-21 18 353 discloses an arrangement of rods for a granulating device for the production of granulate in which the rods are joined to the granulating head of the pressing cylinder. These rods, acting as stringers, serve for the attachment or locking of individual press housings. The drive device and the housing of the cutting device, on the other hand, are arranged on a free-bearing piston rod and are movable therewith, so that changes in position of the pressing cylinder have adverse influence on the granulation, and a reproducible central position of the cutting knives relative to the die plate cannot be assured.

An underwater granulating device is disclosed in U.S. Pat. No. 3,271,821, in which stringers joined with the cutting housing are provided for the purpose of fixing a separate support housing of the cutting shaft against rotation.

In accordance with the invention, by guidably supporting the cutting unit on support shafts together with the drive means, an automatic equilibration between the cutting unit and the granulating head is achieved. Lateral and vertical displacements of the granulating head and the die plate caused by thermal effects are transferred to the support shafts and thus to the cutting device. The guidance of the housing of the cutting device at a distance from the drive means dampens vibrations caused by the drive means.

The cutting unit and its drive means may be integrated as a single unit for easy operation of the granulating head and subsequently can be brought back into the same accurately adjusted position relative to the die plate after a prior displacement. A relatively accurate central positioning of the cutting shaft relative to the die plate is also achieved after longitudinal displacement by the support and guidance of the housing on the guide shafts.

In accordance with a feature of the invention, the housing of the cutting unit is attached to a frame which is rigidly connected to the drive motor of the drive means by a second frame fixed to the drive motor whereby the cutting unit and drive means is displaceable as a common unit on the support shafts.

According to another feature of the invention, the first and second frames are secured together by spacer bolts which are arranged at equal angular spacing around the axis of the drive shaft on a common circle. This construction assures a smooth guidance of the cutting unit and drive means enabling adjustability manually without applying significant force. This simple displacement allows replacement of the drive motor of the drive means or of the coupling between the drive motor and the cutting knives.

In further accordance with the invention, quick release fastening means are provided between the granulating head and the common assembly of the cutting unit and drive means for rapid attachment and release therebetween in precise spaced relation of the cutting knives and the die plate. This arrangement also allows the axis of the cutting shaft with the cutting knives thereon to be adjusted precisely perpendicularly to the surface of the die plate. Manufacturing tolerances and other deviations can be precisely compensated by adjustment of adjustment means of the quick release fastening means. The cutting unit can be secured at a specified spacing of the cutting knives from the die plate by securing the housing of the cutting unit relative to the guide shafts and the granulating head by the quick release fastening means.

The drive motor can be directly secured to the second frame or alternatively, the second frame can be formed as an angle member whose horizontal leg directly supports the drive motor and rests via bearings on the guide shafts.

The guide shafts are spaced at equal distances with respect to the horizontal and vertical planes of the longitudinal axis of the cutting unit to provide smooth guidance of the cutting unit and drive means along the axis of the cutting unit.

DETAILED DESCRIPTION OF PREFERRED EMBODIMENTS

Figure 1:
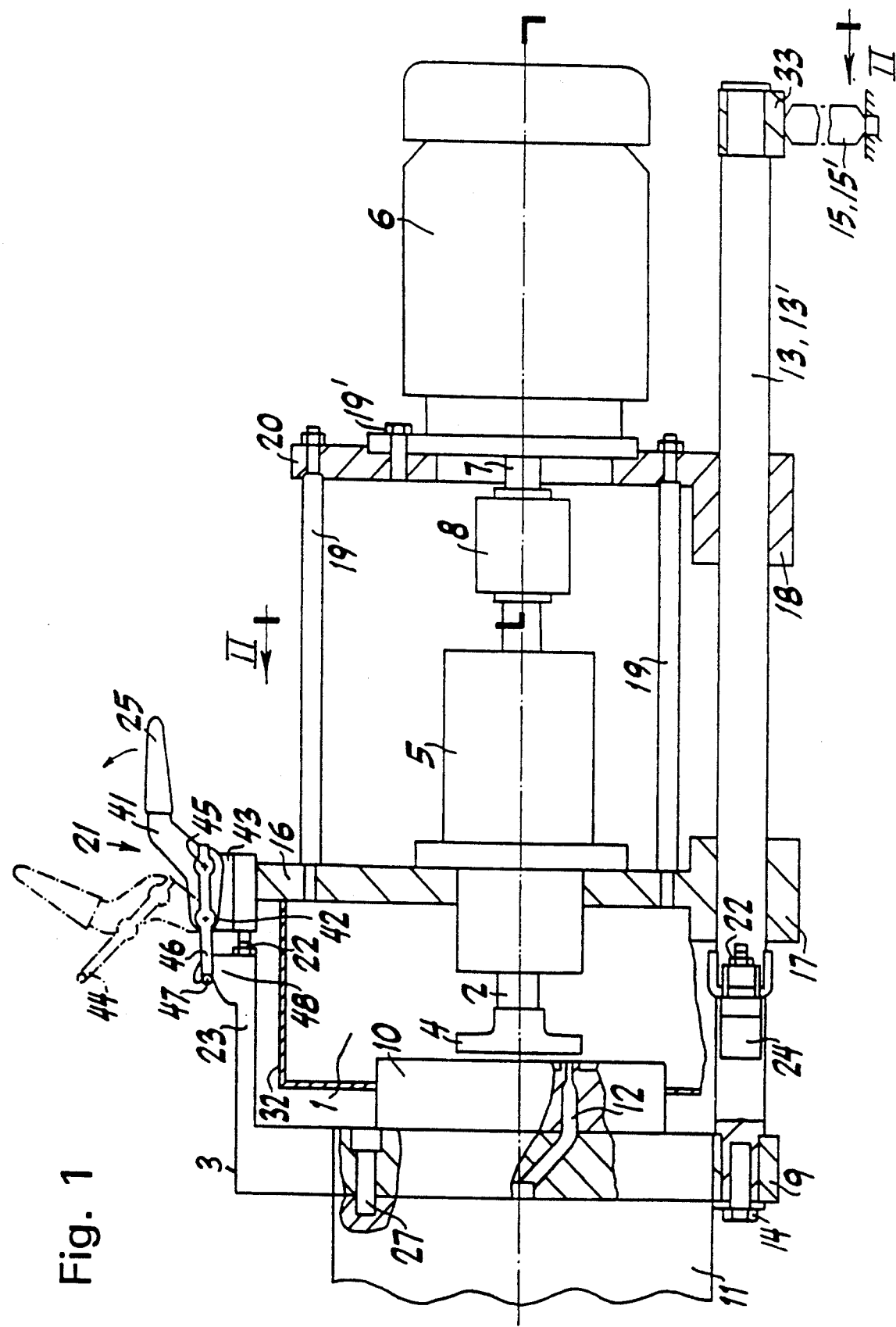
FIG. 1 is a diagrammatic longitudinal elevation view, partly broken away in section, of a granulating device according to the invention.

The granulating device of the invention is constructed as an assembly comprising a cutting unit 1 including a cutting shaft 2, cutting knives 4 secured on shaft 2, a housing 5 surrounding shaft 2 and rotatably supporting shaft 2 in axially secured position therein, and a drive means 6 for rotating the shaft 2 about a longitudinal axis of rotation. The drive means 6 is constituted as a drive motor having a drive shaft 7 which is arranged on a common longitudinal axis with cutting shaft 2 and drive shaft 7 is drivingly connected to shaft 2 by a conventional elastic coupling 8. The motor 6 drives the shaft 2 around its axis of rotation which is centrally disposed with respect to knives 4.

The cutting unit 1 is associated directly with a granulating head 3 of a granulator, the head 3 including a distributor 9 and a die plate 10. The die plate 10 and the cutting knives 4 are surrounded by a housing 32 which defines a cutting chamber. The distributor 9 is attached to an extruder 11 of the granulator, for example, by means of a screw connection (not shown). Plastic compound is discharged from the extruder 11 into the distributor 9 and the plastic compound is then extruded through a number of discharge openings 12 in the die plate 10 in the form of strings of the plastic material. The cutting knives 4 of the cutting unit 1 cut the strings to form granules of the plastic material in the cutting chamber and the granules are removed from the cutting chamber. As is conventional, the cutting chamber can be filled with water so that the cutting operation is effected under water. The term "cutting knives" as used herein is intended to generically describe any cutting tool for granulating the strings of plastic compound and its details of construction are well known in the art and not pertinent to the invention herein.

The cutting unit 1 can be displaced longitudinally, for example, for purposes of cleaning when the cutting operation is interrupted or for adjusting the cutting knives 4 relative to die plate 10 for adjusting the operating position of the knives relative to the strings of plastic material. Additionally, in a rearwardly displaced position of the cutting unit 1, the cutting knives 4 can be replaced. Two rigid guide shafts 13, 13' are rigidly anchored at one end to distributor 9 by means of a screw connection 14, and at the other end, the shafts 13, 13' rest via a yoke 33 on supports 15, 15' on a base of the granulating device. The shafts 13, 13' are vertically supported on supports 15, 15' with universal pivotal capability and longitudinal slidability so that shafts 13, 13' act as propped cantilever beams.

The assembly formed by the cutting unit 1 and the drive means 6 is supported on the guide shafts 13, 13' by means of a frame 16 fixed to the housing 5. The frame 16 has integral guide ears 17, 17' slidably engaged on shafts 13, 13'. A second frame 20 is secured by spacer bolts 19 to frame 16 in longitudinally rearwardly spaced relation from frame 16, i.e. more distant from cutting knives 4. Frame 20 has integral trunnions 18, 18' slidably engaged on shafts 13, 13'. The drive means 6 is secured to frame 20 by bolts 19'. The spacer bolts 19 are arranged at equal angular spacing on a common circle 28 and in combination with frames 16 and 20 form a rigid support assembly for the entire cutting unit 1 capable of longitudinal displacement towards and away from the granulating head 3.

Figure 3:
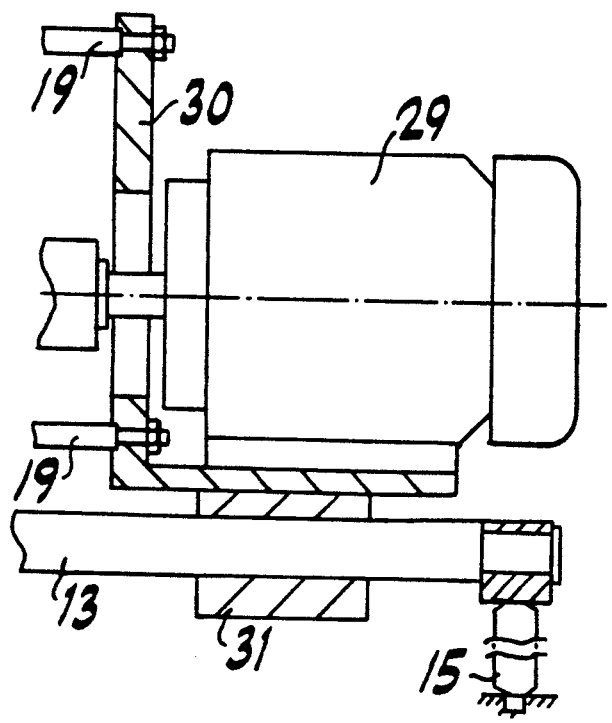
FIG. 3 is a side view, partly in section of a modified embodiment of the drive of the granulating device in FIG. 1.

In the embodiment of FIG. 3, instead of connecting the drive means 6 to frame 20 by bolts 19', a frame 30 of angle configuration is employed. The vertical leg of the frame 30 is connected by bolts 19 to frame 16 and the horizontal leg of the frame 30 directly supports drive motor 29 and is fixedly secured to bearings 31 which are slidably supported on shafts 13, 13'. By this construction, the weight of motor 29 is directly transferred therebelow to bearings 31 and shafts 13, 13'.

Figure 2:
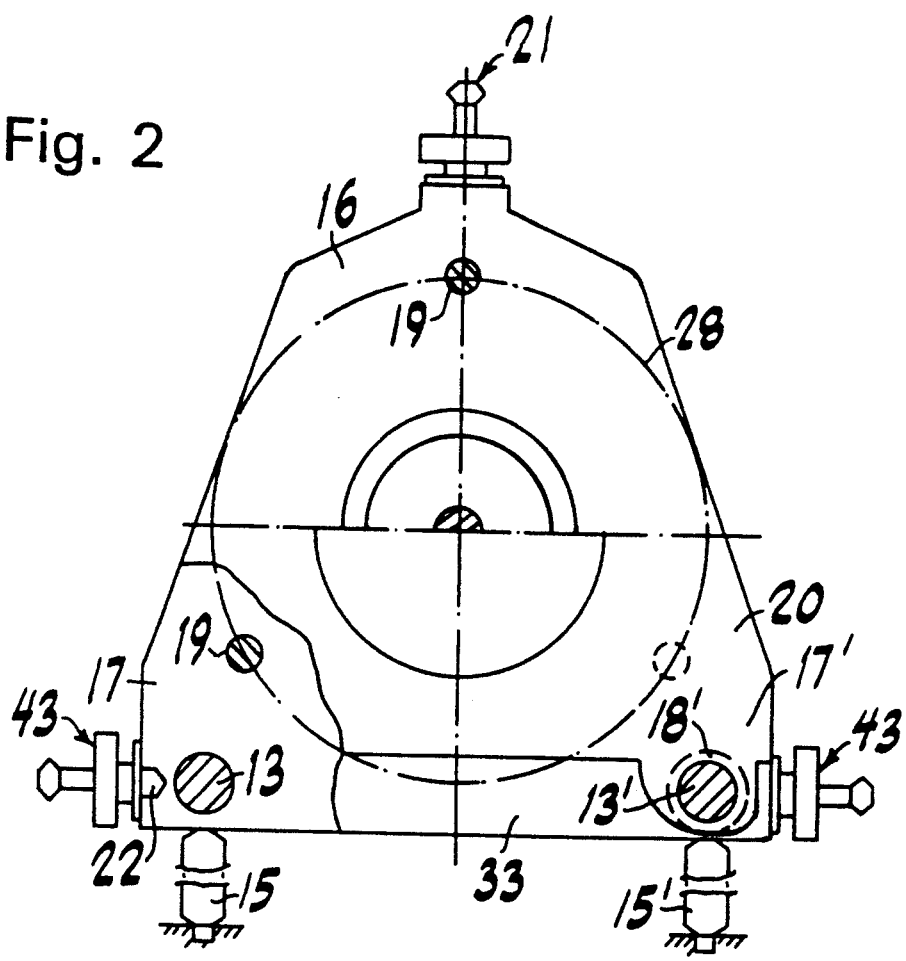
FIG. 2 is an end elevational view, partly in section and partly broken away, as seen along broken line II—II in FIG. 1.

The displacement of cutting unit 1 with cutting shaft 2, housing 5 and drive means 6 into the operating position is easily effected by hand. A quick release fastening means 21 serves for the securing of cutting unit 1 with respect to granulating head 3 and fine adjustment of cutting knives 4 of cutting unit 1 relative to die plate 10. The quick release fastening means 21 is arranged at three positions around frame 16 as shown in FIG. 2 and which will be explained in greater detail later. Each quick release fastening means 21 includes an operating lever mechanism 25 on frame 16 and a fine adjustment screw 22 on granulating head 3.

The quick release fastening means 21 functions as a conventional over-center lockable lever arrangement in which the operating lever mechanism 25 includes a pivotal lever 41 which is connected by a pivot 42 to a fixed block 43 on frame 16, and a pawl 44 pivotably connected to the lever 41 at a pivot 45. The pawl 44 is of U-shape and composed of two spaced parallel links 46 joined at their ends by a rod 47. The rod 47 engages at the back of a hook-shape tang 48, fixed with respect to granulating head 3, for pivotable and slidable movement. When lever 25 is lifted, as shown in dotted outline at the top of FIG. 1, pivot 45 is raised and rod 47 of pawl 44 is released and can be separated from tang 48, whereupon the cutting unit 1 can now be displaced on shafts 13, 13' to move the cutting knives 4 away from die plate 10. In order to lock the cutting unit in an adjusted position of knives 4 relative to die plate 10, first the adjustment screws 22 of the three fastening means 21 are adjusted to projected positions to bring the knives 4 into precise position relative to granulating head 3 and the die plate 10. In this regard, the axis of cutting shaft 2 is adjusted to be perpendicular to the surface of the die plate and the longitudinal spacing of the knives 4 from the surface of the die plate is also adjusted. The rod 47 of the pawl of each fastening means 21 is then engaged at the back of corresponding tang 48 and the lever 25 is lowered until it reaches a locked position at which pivot 45 is at an over-center position below the pivot 42 and the block 43 bears against adjustment screw 22.

The three fastening means 21 (shown in FIG. 2) are arranged on frame 16 at equal angular spacing and equal distances from the axis of rotation of cutting shaft 2. The three fastening means 21 are arranged in a common plate at the same longitudinal distance from die plate 10. The three fastening means 21 are of the same construction as are the fine adjustment screws 22 of each individual fastening means 21. The fine adjustment screws 22 serve for adjusting the cutting knives 4 in a parallel plane and at an adjusted distance with respect to the die plate 10. For this purpose, the fine adjustment screw 22, at the top of frame 16, remote from shafts 13, 13', is supported from distributor 9 of granulating head 3 on a spacer portion 23. The fine adjustment screws 22 arranged in the vicinity of shafts 13, 13' are supported on stops 24 fixed to respective shafts 13, 13'. After centering and planar parallel adjustment of cutting knives 4 is effected by means of the fine adjustment screws 22, cutting unit 1 is secured in the operating position by means of the lever mechanisms 25 of the fastening means 21.

An accurate and reproducible central positioning of cutting shaft 2 and thus of cutting knives 4 is achieved by the support and guidance of cutting unit 1, including its drive means 6, on shafts 13, 13'. Further, the guidance by the shafts 13, 13' produces automatic compensation of cutting shaft 2 in the case of a displacement of die plate 10 caused by temperature effects. Consequently, it is only necessary to control the planar parallel position of cutting knives 4 and, as the case may be, another fine adjustment by means of the respective fine adjustment screws 22. The central positioning of cutting shaft 2 is maintained.

Although the invention has been described with reference to specific embodiments thereof, it will become apparent to those skilled in the art that numerous modifications and variations can be made within the scope and spirit of the invention if defined by the attached claims.

What is claimed is:

1. A granulating device for plastic material comprising a granulating head including a die plate from which plastic material is discharged as strands of plastic material, cutting knives disposed adjacent to said die plate for cutting the strands of plastic material to form granules therefrom, a drive means secured to said cutting knives for driving the cutting knives in rotation about an axis to cut the plastic strands, frame means fixedly secured to said drive means, a pair of guide shafts having first and second ends, said guide shafts slidably supporting said frame means for displacement thereon parallel to the axis of rotation of the cutting knives to move the drive means and the cutting knives therewith towards and away from said die plate, means fixedly securing the first ends of said shafts to said granulating head, and support means supporting the second ends of said shafts at locations spaced from said granulating head, wherein automatic compensation of the position of the cutting knives and drive means relative to the die plate, due to displacement of the die plate caused by thermal expansion, is provided by guidance of the frame means on said guide shafts.

2. A granulating device as claimed in claim 1, wherein said drive means comprises a cutting shaft supporting said cutting knives, a housing for said cutting shaft, and a drive motor drivingly connected to said cutting shaft and longitudinally spaced from said housing, said frame means comprising a first frame fixed to said housing and a second frame fixed to said drive motor, and means on each frame guidably and slidably supporting said first and second frames on said shafts.

3. A granulating device as claimed in claim 2, comprising means connecting said first and second frames together for common movement on said shafts.

4. A granulating device as claimed in claim 3, wherein said means which connects said first and second frames comprises a plurality of spacer bolts secured to said first and second frames.

5. A granulating device as claimed in claim 4, wherein said drive means drives said cutting shaft and said cutting knives around said axis of rotation, said spacer bolts being arranged at equal angular spacing around said axis of rotation on a common circle.

6. A granulating device as claimed in claim 4, comprising quick release fastening means for releasably connecting said first frame and said granulating head, said quick release fastening means including fine adjustment means for adjusting longitudinal spacing of the first frame and the granulating head.

7. A granulating device as claimed in claim 6, wherein said quick release fastening means comprises a plurality of fastening mechanisms arranged on said first frame around the cutting knives at a longitudinal spacing from said die plate.

8. A granulating device as claimed in claim 7, wherein two of said fastening mechanisms are respectively arranged adjacent to said guide shafts.

9. A granulating device as claimed in claim 4, comprising bolt means securing said second frame to said drive motor.

10. A granulating device as claimed in claim 4, wherein said second frame has an angle configuration with a vertical leg fixed to said spacer bolts and a horizontal leg to which is secured said drive motor and said means which guidably and slidably supports the second frame on said guide shafts.

11. A granulating device as claimed in claim 5, wherein said guide shafts are spaced at equal distances, horizontally and vertically from said axis of rotation.

12. A granulating device as claimed in claim 1, wherein said support means comprises a yoke secured to said guide shafts and a pair of supports for said yoke.

13. A granulating device as claimed in claim 12, wherein each of said pair of supports is disposed in proximity with a respective shaft for slidably and pivotably supporting said yoke.

14. A granulating device as claimed in claim 13, wherein each of said supports is disposed below the respective shaft.

* * * * *